[19] United States Patent
Herbst et al.

[11] Patent Number: 6,077,891
[45] Date of Patent: Jun. 20, 2000

[54] STABILIZATION OF DAMAGED THERMOPLASTICS

[75] Inventors: Heinz Herbst; Kurt Hoffmann, both of Lautertal; Rudolf Pfaendner, Rimbach, all of Germany

[73] Assignee: Ciba Specialty Chemicals Corporation, Tarrytown, N.Y.

[21] Appl. No.: 08/919,011

[22] Filed: Aug. 27, 1997

Related U.S. Application Data

[63] Continuation of application No. 08/557,085, filed as application No. PCT/EP94/01663, May 24, 1994, abandoned.

[30] Foreign Application Priority Data

Jun. 9, 1993 [CH] Switzerland ............................. 1736/93
Apr. 22, 1994 [CH] Switzerland ............................. 1257/94

[51] Int. Cl.⁷ ............................. C08K 5/34; C08K 5/15; C08K 5/51; C08K 5/07
[52] U.S. Cl. ............................. 524/101; 524/91; 524/109; 524/130; 524/147; 524/359; 524/394; 524/400; 524/424; 524/427; 524/432; 524/433; 524/436
[58] Field of Search ............................. 524/91, 101, 109, 524/130, 147, 359, 394, 400, 424, 427, 432, 433, 435

[56] References Cited

U.S. PATENT DOCUMENTS 4,504,615 3/1985 Mills ........................................ 524/291
4,814,103 3/1989 Potter et al. ........................ 252/182.22

FOREIGN PATENT DOCUMENTS 2622590 5/1989 France .
81849 6/1980 Luxembourg .

OTHER PUBLICATIONS

Derwent Abstract 93–365377 Oct. 1993.
Chem. Abst. 118:235360m Jan. 1993.
Chem. Abst. 118:104264k Jan. 1993.
Chem Abst. 120:324997h Jan. 1994.
Chem. Abst. 118:214407a Jan. 1993.
Derwent Abstr. 37605c/21, May 7, 1980.
Derwent Abstr. 89–243582/34, May 5, 1989.

*Primary Examiner*—Kriellion Sanders
*Attorney, Agent, or Firm*—Luther A. R. Hall; Jacob M. Levine

[57] ABSTRACT

Damaged thermoplastics can be outstandingly stabilized by the use of a mixture comprising a) 0.05 to 20% by weight, based on the plastic to be stabilized, of at least one polyfunctional epoxide, b) 0.01 to 2% by weight, based on the plastic to be stabilized, of at least one sterically hindered phenol.

19 Claims, No Drawings

STABILIZATION OF DAMAGED THERMOPLASTICS

This application is a continuation of application Ser. No. 08/557,085, filed Dec. 5, 1997 which is a 371 of PCT/EP94/01663 filed May 24, 1994, now abandoned.

The invention relates to a process for the stabilization of damaged thermoplastics, a stabilizer mixture and the recycled plastics obtainable by the process.

During processing and use, thermoplastics (for example polypropylene, polyethylene, polystyrene, polyvinyl chloride . . . ) can as a rule be damaged by thermal stress, oxidation, weathering and light so that the optical and mechanical properties and the resistance to environmental influences markedly decrease. This adverse effect frequently does not permit such recycled products to be used again for the original application (for example agricultural film for agricultural film) or for high-quality applications (for example the automotive sector).

It was therefore the object of the present invention to develop a process which provides recycled thermoplastics having improved mechanical properties while retaining the thermoplastic processability.

Surprisingly, a substantial improvement in properties is achieved by adding a mixture of at least one polyfunctional epoxide, one sterically hindered phenol and one organic phosphite or phosphonite to damaged thermoplastics. Recycled thermoplastics stabilized according to the invention can thus as a rule be used again for their original application or for a comparatively demanding subsequent application.

The invention thus provides a process for the stabilization of damaged thermoplastics, which comprises adding a mixture of a) 0.05 to 20% by weight, based on the plastic to be stabilized, of at least one polyfunctional epoxide and b) 0.01 to 2% by weight, based on the plastic to be stabilized, of at least one sterically hindered phenol to said plastics.

The damaged thermoplastics to be stabilized are, for example, collections of plastics from the household, in trading businesses (for example supermarkets) and in industrial facilities (for example stretch films, bags, etc.). These may be, for example, films, bags, bottles and other containers or foams. However, it is also possible to stabilize plastics of a single type which have been damaged as a result of use, storage or processing, for example production wastes (films, etc.) or separately collected waste materials (agricultural film, automotive parts, etc.).

In particular, the invention relates to the improvement of the properties of damaged thermoplastics or mixtures thereof, such as polyolefins or polystyrene. The polyolefins are usually dominated by polyethylene (PE) and polypropylene (PP), and low density polyethylene (LDPE), linear low density polyethylene (LLDPE) and high density polyethylene (HDPE), as well as copolymers such as ethylene/propylene (EPM) and ethylene/propylene/diene copolymers (EPDM), may be mentioned in particular here. Polystyrene (PS) is also to be understood as meaning copolymers having a styrene content (for example ABS, ASA). The term is also intended to include mixtures of the stated plastics with other conventional thermoplastics, such as PVC, polybutylene terephthalate (PBT) and polyethylene terephthalate (PEI). Polyolefins, for example polyethylene, polypropylene and copolymers thereof, in particular PP/EPDM, and polystyrene are preferred. Furthermore, these recycled products may contain mixtures of customary impurities, for example non-thermoplastics, residues of dyes, coatings, metal traces, traces of operating materials or water, paper or glass or inorganic salts.

The process is very particularly important in the stabilization of PP/EPDM materials from the automotive sector, for example bumpers. Here, the content of coating residues leads to a deterioration in the mechanical properties (for example in the elongation). The stabilization according to the invention compensates for this adverse effect.

The polyfunctional epoxide compounds a) which can be used for the purposes of the invention may have an aliphatic, aromatic, cycloaliphatic, araliphatic or heterocyclic structure; they contain epoxy groups as side groups. The epoxy groups are preferably bonded to the remainder of the molecule as glycidyl groups via ether or ester bonds, or they are N-glycidyl derivatives of heterocyclic amines, amides or imides. Epoxy compounds of these types are generally known and commercially available.

The polyfunctional epoxide compounds contain at least two epoxy radicals, in particular those of the formula A

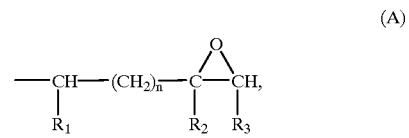

these being bonded directly to carbon, oxygen, nitrogen or sulfur atoms, in which $R_1$ and $R_3$ are both hydrogen, $R_2$ is hydrogen or methyl and n is 0, or in which $R_1$ and $R_3$ together are —$CH_2$—$CH_2$— or —$CH_2$—$CH_2$—$CH_2$—, $R_2$ is then hydrogen and n is 0 or 1.

The following may be mentioned as examples of polyfunctional epoxide compounds:

I) Polyglycidyl and poly-(β-methylglycidyl) esters obtainable by reacting a compound having at least two carboxyl groups in the molecule and epichlorohydrin or glyceryldichlorohydrin or β-methylepichlorohydrin. The reaction is expediently carried out in the presence of bases.

Aliphatic polycarboxylic acids may be used as compounds having at least two carboxyl groups in the molecule. Examples of these polycarboxylic acids are glutaric acid, adipic acid, pimelic acid, suberic acid, azelaic acid, sebacic acid or dimerized or trimerized linoleic acid.

However, it is also possible to use cycloaliphatic polycarboxylic acids, for example tetrahydrophthalic acid, 4-methyltetrahydrophthalic acid, hexahydrophthalic acid or 4-methylhexahydrophthalic acid.

Aromatic polycarboxylic acids may also be used, for example phthalic acid, isophthalic acid, trimellitic acid or pyromellitic acid.

Carboxyl-terminated adducts, for example of trimellitic acid and polyols, such as glycerol or 2,2-bis(4-hydroxycyclohexyl)propane, may also be used.

II) Polyglycidyl or poly-(β-methylglycidyl) ethers obtainable by reacting a compound having at least two free alcoholic hydroxyl groups and/or phenolic hydroxyl groups and a suitably substituted epichlorohydrin under alkaline conditions, or in the presence of an acidic catalyst and with subsequent treatment with an alkali.

Ethers of this type are derived, for example, from acyclic alcohols, such as ethylene glycol, diethylene glycol and higher poly(oxyethylene) glycols, propane-1,2-diol or poly (oxypropylene) glycols, propane-1,3-diol, butane-1,4-diol, poly(oxytetramethylene) glycols, pentane-1,5-diol, hexane-1,6-diol, hexane-2,4,6-triol, glycerol, 1,1,1-trimethylolpropane, bistrimethylolpropane, pentaerythritol or sorbitol, and from polyepichlorohydrins.

However, they are also derived, for example, from cycloaliphatic alcohols, such as 1,3- or 1,4- dihydroxycyclohexane, bis(4-hydroxycyclohexyl)methane, 2,2-bis(4-hydroxycyclohexyl)propane or 1,1-bis (hydroxymethyl)cyclohex-3-ene, or they have aromatic nuclei, such as N,N-bis(2-hydroxyethyl)aniline or p,p'-bis (2-hydroxyethylamino)diphenylmethane.

The epoxide compounds may also be derived from mononuclear phenols, for example from resorcinol or hydroquinone; or they are based on polynuclear phenols, for example on bis(4-hydroxyphenyl)methane, 2,2-bis(4-hydroxyphenyl)propane, 2,2-bis(3,5dibromo-4-hydroxyphenyl)propane or 4,4'-dihydroxydiphenylsulfone, or on condensates of phenols with formaldehyde, such as phenol novolaks, which condensates are obtained under acidic conditions.

III) Poly-(N-glycidyl) compounds obtainable by dehydrochlorination of the reaction products of epichlorohydrin with amines which contain at least two aminohydrogen atoms. These amines are, for example, aniline, toluidine, n-butylamine, bis(4-aminophenyl)methane, m-xylylenediamine or bis(4-methylaminophenyl)methane, as well as N,N,O-triglycidyl-m-aminophenol or N,N,O-triglycidyl-p-aminophenol.

However, the poly-(N-glycidyl) compounds also include N,N'-diglycidyl derivatives of cycloalkyleneureas, such as ethyleneurea or 1,3-propyleneurea, and N,N'-diglycidyl derivatives of hydantoins, such as those of 5,5-dimethylhydantoin.

IV) Poly-(S-glycidyl) compounds, for example di-S-glycidyl derivatives which are derived from dithiols, for example ethane-1,2-dithiol or bis(4-mercaptomethylphenyl) ether.

V) Epoxide compounds having a radical of the formula A, in which $R_1$ and $R_3$ together are —CH$_2$—CH$_2$— and n is 0, are bis(2,3-epoxycyclopentyl) ether, 2,3-epoxycyclopentyl glycidyl ether or 1,2-bis(2,3-epoxycyclopentyloxy)ethane. An epoxy resin having a radical of the formula I, in which $R_1$ and $R_3$ together are —CH$_2$—CH$_2$— and n is 1, is, for example, 3',4'-epoxy-6'-methylcyclohexylmethyl 3,4-epoxy-6-methylcyclohexanecarboxylate.

Suitable epoxides are, for example:

a) liquid bisphenol A diglycidyl ethers, such as Araldit® GY 240, Araldit® GY 250, Araldit® GY 260, Araldit® GY 266, Araldit® GY 2600, Araldit® MY 790;

b) solid bisphenol A diglycidyl ethers, such as Araldit® GT 6071, Araldit® GT 7071, Araldit® GT 7072, Araldit® GT 6063, Araldit® GT 7203, Araldit® GT 6064, Araldit® GT 7304, Araldit® GT 7004, Araldit® GT 6084, Araldit® GT 1999, Araldit® GT 7077, Araldit® GT 6097, Araldit® GT 7097, Araldit® GT 7008, Araldit® GT 6099, Araldit® GT 6608, Araldit® GT 6609, Araldit® GT 6610;

c) liquid bisphenol F diglycidyl ethers, such as Araldit® GY 281, Araldit® GY 282, Araldit® PY 302, Araldit® PY 306;

d) solid polyglycidyl ethers of tetraphenylethane, such as CG Epoxy Resin® 0163;

e) solid and liquid polyglycidyl ethers of phenol/formaldehyde novolak, such as EPN 1138, EPN 1139, GY 1180, PY 307;

f) solid and liquid polyglycidyl ethers of o-cresol/formaldehyde novolak, such as ECN 1235, ECN 1273, ECN 1280, ECN 1299;

g) liquid glycidyl ethers of alcohols, such as Shell® glycidyl ether 162, Araldit® DY 0390, Araldit® DY 0391;

h) liquid glycidyl ethers of carboxylic acids, such as Shell® Cardura E terephthalate, trimellitate, Araldit® PY 284;

i) solid heterocyclic epoxy resins (triglycidyl isocyanurate), such as Araldit® PT 810;

j) liquid cycloaliphatic epoxy resins, such as Araldit® CY 179;

k) liquid N,N,O-triglycidyl ethers of p-aminophenol, such as Araldit® MY 0510;

l) tetraglycidyl-4-4'-methylenebenzamine or N,N,N',N'-tetraglycidyldiaminophenylmethane, such as Araldit® MY 720, Araldit® MY 721.

A mixture of epoxide compounds of different structures may, if desired, also be used.

Component a) preferably comprises two groups of the formula

Particularly preferred components a) are compounds of the types (I) to (III) or mixtures of these

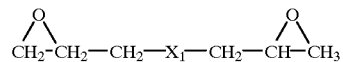 (I)

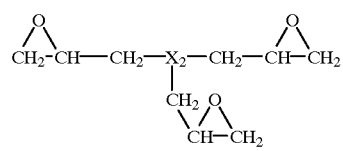 (II)

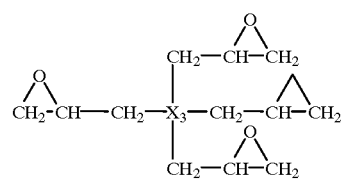 (III)

in which $X_1$, $X_2$ and $X_3$ are cyclohexylene, phenylene or naphthylene which may be unsubstituted or substituted and XI is additionally an unsubstituted or substituted radical of the formula

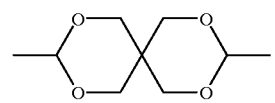

and $X_2$ is additionally an unsubstituted or substituted radical of the formula

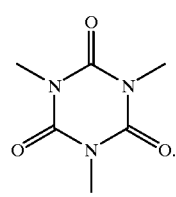

Suitable substituents for the abovementioned radicals are —O—, —S—, —C(O)—, —C(O)O—, —S(O)—, —S(O$_2$)—, —C(CF$_3$)$_2$—, alkyl, alkylene, aryl, arylene, alkoxy, aryloxy or halogen, and several identical or different substituents may be present or substituents may in turn be substituted.

A suitable alkyl radical is, for example, a $C_1$–$C_{18}$ alkyl radical, such as methyl, ethyl, n-propyl, n-butyl, sec-butyl, tert-butyl, n-hexyl, n-octyl, 2-ethylhexyl, n-nonyl, n-decyl, n-undecyl, n-dodecyl, n-tridecyl, n-tetradecyl, n-hexadecyl or n-octadecyl, and further branched isomers.

Possible alkylene and alkoxy radicals may be formally derived from the abovementioned alkyl radicals by removing a further H atom or adding an O atom.

Suitable aryl radicals are, for example, radicals having 6–20 C atoms, such as phenylene, biphenylene or naphthylene.

Possible arylene and aryloxy radicals may be formally derived from the abovementioned aryl radicals by removing a further H atom or adding an O atom.

Preferred radicals are those of the following formulae:

for X =

(IVa) 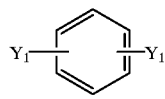

(IVb) 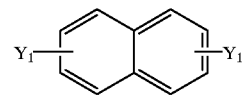

(IVc) 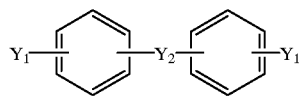

(IVd)

(IVe) 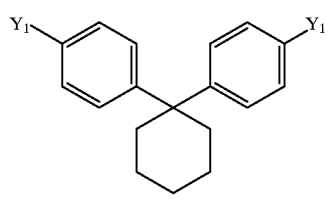

(IVf) 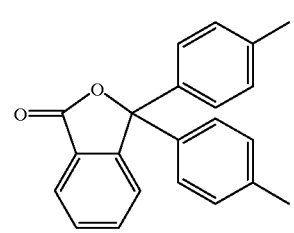

(IVg) 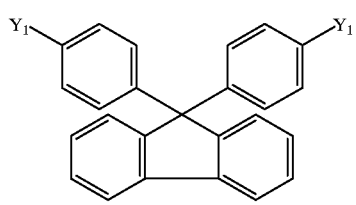

(IVh) 

(IVi) 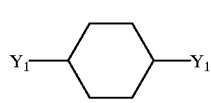

(IVk) 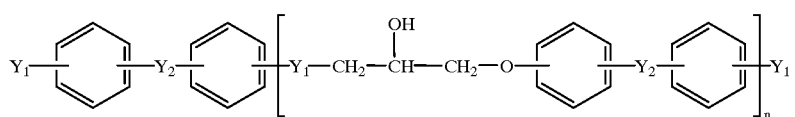

for $X_2$ =

(Va) 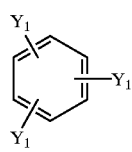

(Vb) 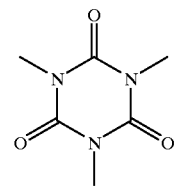

-continued
(Vc) 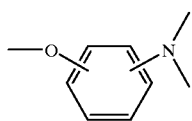
(Vd) 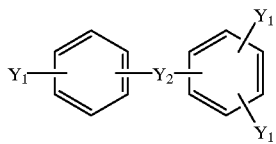
(Ve) 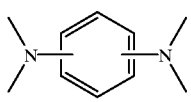
for $X_3 =$
(VIa) 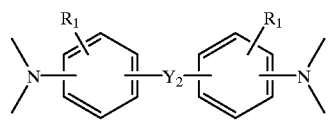
(VIb)
(VIc) 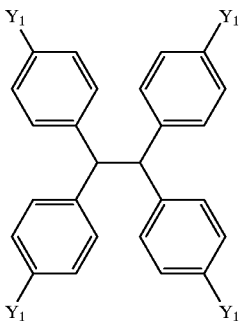
in which
$Y_1$ is a direct bond, —O—, —S—,
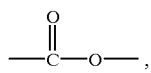
$Y_2$ is a direct bond, —SO$_2$—, —CO—, —S—, —SO—, —CH$_2$—, —C(CH$_3$)$_2$— or —C(CF$_3$)$_2$—
and
$n$ is 1–10.
The aromatic rings are unsubstituted or monosubstituted or polysubstituted by alkyl, aryl, alkoxy, aryloxy or halogen, as described in detail above.
Particularly preferred components a) are the compounds
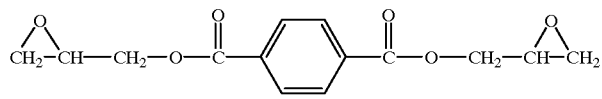
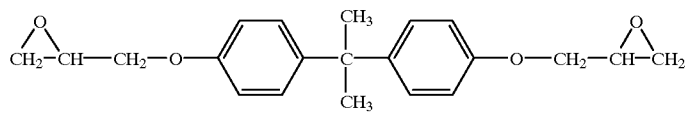
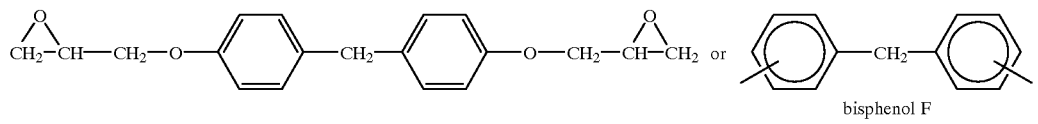
bisphenol F
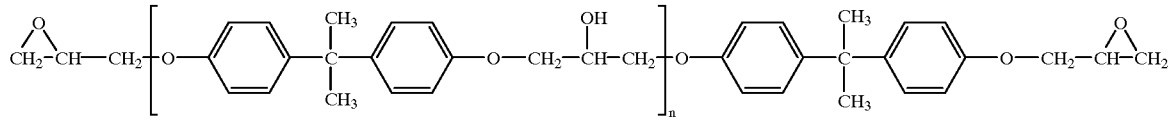
$n = 1–10$

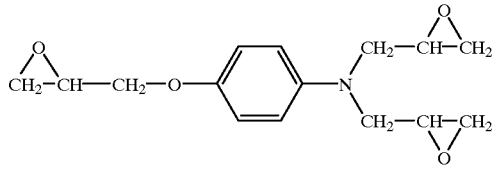
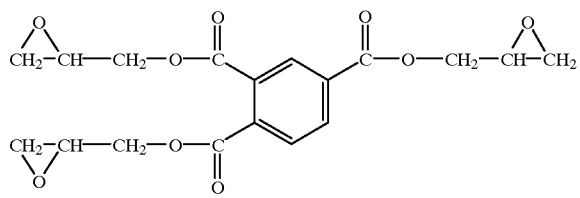
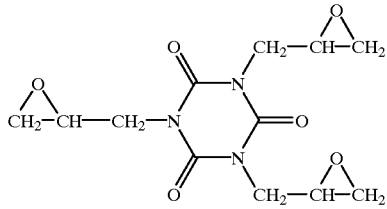
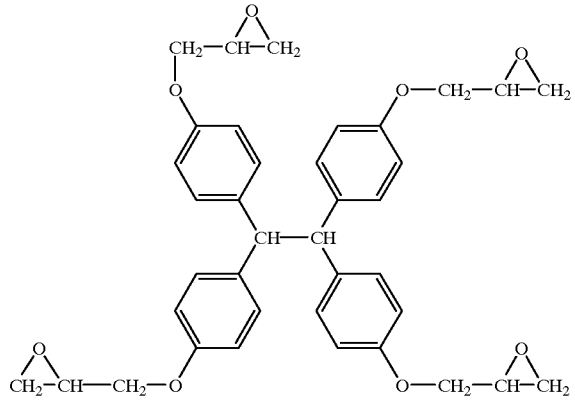

The sterically hindered phenols used as component b) are stabilizers which are known per se. These compounds preferably comprise at least one group of the formula

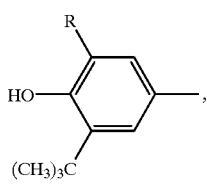

(B)

in which R is hydrogen, methyl or tert-butyl.

Examples of such sterically hindered phenols are: 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl4-isobutylphenol, 2,6dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, 2,6-dinonyl-4-methylphenol, 2,6-di-tert-butyl-4-methoxyphenol, 2,5-di-tert-butylhydroquinone, 2,5-di-tert-amylhydroquinone, 2,6-diphenyl-4-octadecyloxyphenol, 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 2,2'-methylenebis(6-tert-butyl-4-methylphenol), 2,2'-methylenebis(6-tert-butyl-4-ethylphenol), 2,2'-methylenebis [4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis (4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,αdimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis (5-tert-butyl-4-hydroxy-2-methylphenyl)-3-n-dodecylmercaptobutane, ethylene glycol bis[3,3-bis(3'-tert-butyl-4'-hydroxyphenyl)butyrate], bis(3-tert-butyl-4-hydroxy-5-methylphenyl)dicyclopentadiene, bis[2-(3'-tert-butyl-2'-hydroxy-5'-methylbenzyl)-6-tert-butyl-4-methylphenyl] terephthalate, 1,3,5-tris(3,5-di-tert-butyl-4-hydroxybenzyl)-2,4,6-trimethylbenzene, bis(3,5-di-tert-butyl-4-hydroxybenzyl) sulfide, isooctyl 3,5-di-tert-butyl-4-hydroxybenzylmercaptoacetate, bis(4-tert-butyl-3-hydroxy-2,6-dimethylbenzyl)dithiol terephthalate, 1,3,5-tris(3,5-di-tert-butyl-4-hydroxybenzyl) isocyanurate, 1,3,5-tris(4tert-butyl-3-hydroxy-2,6-dimethylbenzyl) isocyanurate, 2,2'-methylenebis(6-tert-butyl-4-methylphenol) monoacrylate, 2,4-bis(octylthiomethyl)-6-methylphenol, dioxtadecyl 3,5-di-tert-butyl-4-hydroxybenzylphosphonate and the calcium salt of monoethyl 3,5 di-tert-butyl-4-hydroxybenzylphosphonate, and compounds derived from tocopherol.

Particularly preferred components b) are compounds which comprise at least one group of the formula

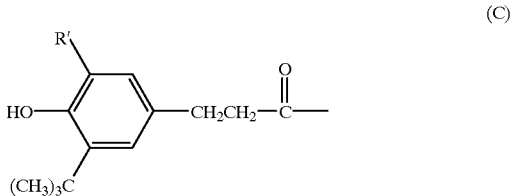

(C)

in which R' is methyl or tert-butyl.

Examples of such hindered phenols are the esters of β-(3,5-di-tert-butyl-4-hydroxyphenyl)propionic acid and of β-(5-tert-butyl-4-hydroxy-3-methylphenyl)propionic acid with monohydric or polyhydric alcohols, for example with methanol, octanol, octadecanol, 1,6-hexanediol, neopentylglycol, thiodiethylene glycol, diethylene glycol, triethylene glycol, pentaerythritol, tris(hydroxyethyl) isocyanurate or N,N'-bis(hydroxyethyl)oxalamide, and the amides of these acids, for example N,N'-bis(3,5-di-tert-butyl-4-hydroxyphenylpropionyl)hexamethylenediamine, N,N'-bis(3,5-di-tert-butyl-4-hydroxyphenylpropionyl) trimethylenediamine and N,N'-bis(3,5-di-tert-butyl-4-hydroxyphenylpropionyl)hydrazine.

Particularly preferred components b) are the pentaerythrityl esters and the octadecyl esters of β-(3,5-di-tert-butyl-4-hydroxyphenyl)propionic acid and triethylene glycol bis-3-(3-tert-butyl-4-hydroxy-5-methylphenyl)propionate.

In addition to components a) and b), it is also possible to use, if desired, c) 0.01 to 2% by weight, based on the plastic to be stabilized, of at least one organic phosphite or phosphonite for the stabilization.

The organic phosphites and phosphonites which can be used as component c) are likewise known as stabilizers for plastics.

Suitable organic phosphites are those of the general formula $P(OR)_3$, in which the radicals R are identical or different alkyl, alkenyl, aryl or aralkyl radicals. Preferred organic phosphites are those of the formulae

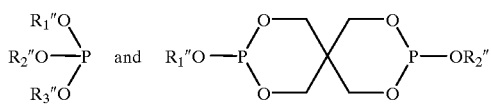

in which $R_1''$, $R_2''$ and $R_3''$ are identical or different and are $C_6$–$C_{18}$alkyl, $C_6$–$C_{18}$alkenyl, a substituted or unsubstituted phenyl radical or $C_5$–$C_7$cycloalkyl.

$C_6$–$C_{18}$alkyl radicals $R_1''$, $R_2''$ and $R_3''$ are, for example, n-hexyl, n-octyl, n-nonyl, decyl, dodecyl, tetradecyl, hexadecyl or octadecyl. Alkyl groups having 8 to 18 C atoms are preferred.

Substituted phenyl radicals $R_1''$, $R_2''$ and $R_3''$ are, for example, tolyl, ethylphenyl, xylyl, cumyl, cymyl, cresyl, 4-methoxyphenyl, 2,4dimethoxyphenyl, ethoxyphenyl, butoxyphenyl, p-n-octylphenyl, p-n-nonylphenyl or p-n-dodecylphenyl.

These are predominantly aromatic phosphites and phosphonites. Examples of these are triphenyl phosphite, diphenyl alkyl phosphites, phenyl dialkyl phosphites, tris (nonylphenyl) phosphite, trilauryl phosphite, trioctadecyl phosphite, distearyl pentaerythrityl diphosphite, tris(2,4-di-tert-butylphenyl) phosphite, distearyl pentaerythrityl diphosphite, bis(2,4-di-tert-butylphenyl) pentaerythrityl diphosphite, tristearyl sorbityl triphosphite, tetrakis(2,4-di-tert-butylphenyl)-4,4'-biphenylene diphosphonite, 3,9-bis(2, 4-di-tert-butyl-4-methylphenoxy)-2,4,8,10-tetraoxa-3,9-iphosphaspiro[5,5]undecane, 3,9-tris(2,4,6-tris-tert-butylphenoxy)-2,4,8,10-tetraoxa-3,9-diphosphaspiro[5,5] undecane and 2,2'-ethylidenebis(4,6-di-tert-butylphenyl) fluorophosphite.

Tetrakis(2,4-di-tert-butylphenyl)-4,4'-biphenylene diphosphonite, tris(2,4-di-tert-butylphenyl) phosphite or tris (4-nonylphenyl) phosphite is particularly preferably used as component c).

In addition to components a) and b) or a), b) and c), d) up to 10% by weight, based on the plastic to be stabilized, of an inorganic compound from the series comprising the metal oxides, hydroxides or carbonates or a metal salt of a fatty acid, where the metal may be, in particular, an element of main or subgroup II, can, if desired, also be used for the stabilization.

The inorganic compounds from the series comprising the metal oxides, hydroxides or carbonates are in particular metal oxides, hydroxides or carbonates of the elements of main group II and subgroup II, IV or VII, the oxides being particularly preferred, such as MgO, $TiO_2$, ZnO, $MnO_2$ and very particularly CaO.

The metal salts of fatty acids (metal soaps) are in particular zinc, tin, magnesium or calcium salts from the series comprising the aliphatic saturated $C_2$–$C_{22}$carboxylates, the aliphatic unsaturated $C_3$–$C_{12}$carboxylates, the aliphatic $C_2$–$C_{22}$carboxylates which are substituted by at least one OH group, the cyclic and bicyclic carboxylates having 5–22 C atoms, the phenylcarboxylates which are unsubstituted, substituted by at least one OH group and/or $C_1$–$C_{16}$alkyl-substituted, the naphthylcarboxylates which are unsubstituted, substituted by at least one OH group and/or $C_1$–$C_{16}$alkyl-substituted, the phenyl-$C_1$–$C_{16}$alkylcarboxylates, the naphthyl-$C_1$–$C_{16}$alkylcarboxylates or the unsubstituted or $C_1$–$C_{12}$alkyl-substituted phenolates, stearates and laurates being preferred.

If desired, mixtures of compounds of the stated components a), b), c) and d) may also be used in place of individual compounds.

The weight ratio of the components b:c is preferably 10:1 to 1:10, in particular 4:1 to 1:4.

The weight ratio of the components (b+c):d is preferably 10:1 to 1:20, in particular 5:1 to 1:10.

The weight ratio of the components a:(b+c+d) is preferably 100:1 to 1:10, in particular 50:1 to 1:1.

Depending on specific requirements, further undermentioned conventional substances may be added to the damaged thermoplastics, in addition to the stated components a) to d).

Suitable stabilizers from the series comprising the lactates, for example calcium lactate or calcium stearoyl-2-lactylate, or lactones, for example

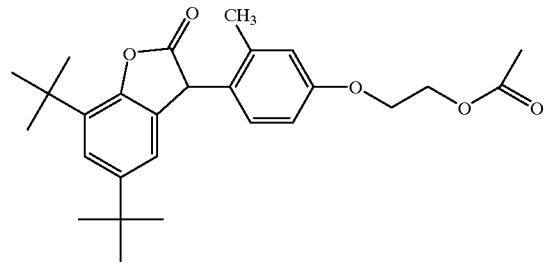

may be added as a supplementary stabilizer.

Examples of suitable UV absorbers and light stabilizers are:

1.2-(2'-Hydroxyphenyl)benzotriazoles, for example 2-(2'-hydroxy-5 '-methylphenyl)benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chlorobenzotriazole, 2-(3'-tert-butyl-2'-hydroxy-5'-methylphenyl)-5-chlorobenzotriazole, 2-(3'-sec-butyl-5'-tert-butyl-2'-hydroxyphenyl) benzotriazole, 2-(2'-hydroxy-4-octyloxyphenyl) benzotriazole, 2-(3',5'-di-tert-amyl-2'-hydroxyphenyl) benzotriazole, 2-(3',5'-bis(α,α-dimethylbenzyl)-2'-hydroxyphenyl)benzotriazole, mixture of 2-(3'-tert-butyl-2'-hydroxy-5'-(2-octyloxycarbonylethyl)phenyl)-5-chlorobenzotriazole, 2-(3'-tert-butyl-5'-[2-(2-ethylhexyloxy)carbonylethyl]-2'-hydroxyphenyl)-5-chlorobenzotriazole, 2-(3'-tert-butyl-2'-hydroxy-5'-(2-methoxycarbonyl-ethyl)phenyl)-5-chlorobenzotriazole, 2-(3'-tert-butyl-2'-hydroxy-5'-(2-methoxycarbonyl-ethyl) phenyl)benzotriazole, 2-(3'-tert-butyl-2'-hydroxy-5'-(2-octyloxycarbonylethyl)-phenyl)benzotriazole, 2-(3'-tert-butyl-5'-[2-(2-ethylhexyloxy)carbonylethyl]-2'- hydroxyphenyl)benzotriazole, 2-(3'-dodecyl-2'-hydroxy-5'-methylphenyl)benzotriazole, and 2-(3'-tert-butyl-2'-hydroxy-5'-(2-isooctyloxycarbonylethyl)phenyl) benzotriazole, 2,2'-methylenebis[4-(1,1,3,3-tetramethylbutyl)-6-benzotriazol-2-ylphenol]; transesterification product of 2-[3'-tert-butyl-5'-(2-methoxycarbonylethyl)-2'-hydroxyphenyl]benzotriazole with polyethylene glycol 300; [R—CH$_2$CH$_2$—COO(CH$_2$)$_3$]— in which R=3'-tert-butyl-4'-hydroxy-5'-2H-benzotriazol-2-ylphenyl.

2.2-Hydroxybenzophenones, for example the 4-hydroxy, 4-methoxy, 4-octyloxy, 4-decyloxy, 4-dodecyloxy, 4-benzyloxy, 4,2',4'-trihydroxy or 2'-hydroxy4,4'-dimethoxy derivative.

3. Esters of substituted or unsubstituted benzoic acids, for example 4-tert-butylphenyl salicylate, phenyl salicylate, octylphenyl salicylate, dibenzoylresorcinol, bis(4-tert-butylbenzoyl)resorcinol, benzoylresorcinol, 2,4-di-tert-butylphenyl 3,5-di-tert-butyl-4-hydroxybenzoic acid, hexadecyl 3,5-di-tert-butyl-4hydroxybenzoate, octadecyl 3,5-di-tert-butyl-4-hydroxybenzoate and 2-methyl-4,6di-tert-butylphenyl 3,5-di-tert-butyl-4-hydroxybenzoate.

4. Acrylates, for example ethyl or isooctyl α-cyano-β,β-diphenylacrylate, methyl α-carbomethoxycinnamate, methyl or butyl α-cyano-β-methyl-p-methoxycinnamate, methyl α-carbomethoxy-p-methoxycinnamate and N-(β-carbomethoxy-β-cyanovinyl)-2-methylindoline.

5. Nickel compounds, for example nickel complexes of 2,2'-thiobis[4-(1,1,3,3-tetramethylbutyl)phenol], such as the 1:1 or the 1:2 complex, if desired with additional ligands, such as n-butylamine, triethanolamine or N-cyclohexyldiethanolamine, nickel dibutyldithiocarbamate, nickel salts of monoalkyl 4-hydroxy-3,5-di-tert-butylbenzylphosphonates, such as those of methyl or ethyl ester, nickel complexes of ketoximes, such as those of 2-hydroxy-4-methylphenyl undecyl ketoxime, and nickel complexes of 1-phenyl-4-lauroyl-5-hydroxypyrazole, if desired with additional ligands.

6. Sterically hindered amines, for example bis(2,2,6,6-tetramethylpiperidyl) sebacate, bis(2,2,6,6-tetramethylpiperidyl) succinate, bis(1,2,2,6,6-pentamethylpiperidyl) sebacate, bis(1,2,2,6, 6pentamethylpiperidyl) n-butyl-3,5-di-tert-butyl4-hydroxybenzylmalonate, condensate of 1-hydroxyethyl-2,2, 6,6-tetramethyl-4-hydroxypiperidine and succinic acid, condensate of N,N'-bis(2,2,6,6-tetramethyl-4-piperidyl) hexamethylenediamine and 4-tert-octylamino-2,6-dichloro-1,3,5-s-triazine, tris(2,2,6,6-tetramethyl-4-piperidyl) nitrilotriacetate, tetrakis(2,2,6,6-tetramethyl-4-piperidyl) 1,2,3,4-butanetetraoate, 1,1'-(1,2-ethanediyl)bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl) 2-n-butyl-2-(2-hydroxy-3,5-di-tert-butylbenzyl)malonate, 3-n-octyl-7,7,9,9-tetramethyl-1,3,8-triazaspiro[4.5]decane-2,4-dione, bis(1-octyl-oxy-2,2,6,6-tetramethylpiperidyl) sebacate, bis(1-octyloxy-2,2,6,6-tetramethylpiperidyl) succinate, condensate of N,N'-bis(2,2,6,6-tetramethyl-4-piperidyl)hexamethylenediamine and 4-morpholino-2,6-dichloro-1,3,5-triazine, condensate of 2-chloro-4,6-di-(4-n-butylamino-2,2,6,6-tetramethylpiperidyl)-1,3,5-triazine and 1,2-bis(3-aminopropylamino)ethane, condensate of 2-chloro-4,6-di-(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2, 5-dione and 3-dodecyl-1-(1,2,2,6,6-pentamethyl-4-piperidyl)pyrrolidine-2,5-dione.

7. Oxalamides, for example 4,4'-dioctyloxyoxanilide, 2,2'-diethoxyoxanilide, 2,2'-dioctyloxy-5,5'-di-tert-butyloxanilide, 2,2'-didodecyloxy-5,5'-di-tert-butyloxanilide, 2-ethoxy-2'-ethyloxanilide, N,N'-bis(3-dimethylaminopropyl)oxalamide, 2-ethoxy-5-tert-butyl-2'-ethyloxanilide and its mixture with 2-ethoxy-2'-ethyl-5,4'-di-tert-butyloxanilide and mixtures of o- and p-methoxy- and of o- and p-ethoxy-disubstituted oxanilides.

8.2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)4,6-bis(2,4-dimethylphenyl)-1, 3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis (2,4-dimethylphenyl)-1,3,5-triazine, 2-[2-hydroxy-4-(2-hydroxy-3-butyl-oxypropyloxy)phenyl]-4,6-bis(2,4-dimethylphenyl)-1,3,5-triazine, 2-[2-hydroxy-4-(2-hydroxy-3-octyloxypropyloxy)phenyl]-4,6-bis(2,4-dimethylphenyl)-1,3,5-triazine.

Light stabilizers from the series comprising the benzophenones, benzotriazoles, oxanilides or sterically hindered amines or mixtures thereof, for example in an amount of 0.01 to 2% by weight, based on the recycled plastic, are preferably added. A light stabilizer from the series comprising the benzotriazoles and a light stabilizer from the series comprising the sterically hindered amines are particularly preferably added The stabilizing effect of the mixture according to the invention, in particular the processing stability and long-term stability, can, if desired, be synergistically enhanced by adding so-called thiosynergists. These are aliphatic thioethers, in particular esters of thiodipropionic acid. Examples of these are the lauryl, stearyl, myristyl or tridecyl ester of thiodipropionic acid or distearoyl sulfide. These thiosynergists are preferably used in an amount of 0.1 to 1% by weight, based on the recycled material.

Examples of suitable peroxide-destroying compounds are: esters of P-thiodipropionic acid, for example the lauryl, stearyl, myristyl or tridecyl ester, mercaptobenzimidazole, the zinc salt of 2-mercaptobenzimidazole, zinc dibutyldithiocarbamate, dioctadecyl disulfide, pentaerythrityl tetrakis(β-dodecylmercapto)propionate or ethylene glycol bismercaptoacetate.

If required, further conventional plastics additives, for example fillers, such as wood meal or mica, reinforcing agents, such as glass fibres, glass spheres or mineral fibres, pigments, adhesives, plasticizers, lubricants, flarneproofing agents, antistatic agents or blowing agents, may be added to the damaged plastic. Such additives depend on the intended use of the recycled product.

Further conventional plastics additives may also be polymers which improve the material properties of the damaged plastic, for example elastomers (impact modifiers) and compatibilizers. Impact modifiers are homo- or copolymers which can modify brittle polymers in such a way that they have good impact strength even at low temperatures. Inter alia, EP(D)M polymers, ABR, BR and SBR graft polymers are suitable for this purpose.

The compatibilizers may be, for example, copolymers, in particular block copolymers, of styrene with butadiene and, if desired, acrylonitrile. They may be copolymers of ethylene and propylene and, if desired, may contain a third monomer component, for example butadiene.

Chlorinated polyethylene or ethylene/vinyl acetate copolymers are also suitable as compatibilizers, the particular composition of the recycled product naturally being important.

Further suitable compatibilizers contain in particular polar groups, for example maleic anhydride/styrene copolymers or graft polymers having acrylic acid groups.

The polymeric compatibilizers are used in general in amounts of 2–20% by weight, based on the plastic to be stabilized.

The recycled products thus stabilized can be used for a very wide range of purposes, for example for pipes, profiles, sheets, cable insulations, sports equipment, garden furniture, films, structural parts, parts of vehicles and machines and containers of any type, for example bottles, foamed materials, such as insulation panels or packaging material.

The recycled product may also be mixed with virgin plastics or used together with virgin plastics, for example in a coextrusion process.

The invention also relates to the recycled thermoplastics obtainable by the process described.

The invention also relates to the use of a mixture comprising a) 0.05 to 20% by weight, based on the plastic to be stabilized, of at least one polyfunctional epoxide, b) 0.01 to 2% by weight, based on the plastic to be stabilized, of at least one sterically hindered phenol and, if desired, c) 0.01 to 2% by weight, based on the plastic to be stabilized, of at least one organic phosphite or phosphonite for stabilizing damaged thermoplastics. The preferences with regard to the use correspond to those for the process.

The invention also provides mixtures comprising, in addition to a damaged thermoplastic, a) 0.05 to 20% by weight, based on the plastic to be stabilized, of at least one polyfunctional epoxide, b) 0.01 to 2% by weight, based on the plastic to be stabilized, of at least one sterically hindered phenol and, if desired, c) 0.01 to 2% by weight, based on the plastic to be stabilized, of at least one organic phosphite or phosphonite. The preferences with regard to the mixtures correspond to those for the process.

The invention also provides mixtures comprising a) at least one polyfunctional epoxide, b) at least one sterically hindered phenol, c) at least one organic phosphite or phosphonite and d) at least one inorganic compound from the series comprising the metal oxides, hydroxides or carbonates or a metal salt of a fatty acid, the weight ratio of components b:c being 10:1 to 1:10; the weight ratio of components (b+c):d being 10:1 to 1:20; and the weight ratio of components a:(b+c+d) being 100:1 to 1:10. The preferences with regard to the mixtures correspond to those for the process.

The following examples illustrate the invention in detail without the invention being restricted to these examples. In the following examples, parts and percentages are by weight, unless stated otherwise.

Damaged thermoplastics used in the examples:

A) Damaged polyolefins

Fresh polyolefin material is subjected to thermal damage or damage by shearing, by extrusion using a twin-screw extruder (ZSK).

Polypropylene: extruded once, 280° C., 100 rpm

Polyethylene: extruded five times, 280° C., 100 rpm

B) Production wastes of biaxially oriented PP film, damaged by agglomeration at high temperature C) Hollow polyolefin material (90% HDPE, 10% PP)

The polyolefin fraction originates from a collection of domestic plastics waste.

After comminution and washing, the polyolefin fraction was separated from the remaining plastics of the domestic waste with the aid of hydrocyclone technology and was granulated.

D) Milled material from coated waste bumpers made from PP/EPDM

E) Regranulated material from waste battery containers made from PP

F) EPS recycled material from packaging

Stabilizers used:

A-1: N,N,O-Triglycidyl-p-aminophenol

A-2: N,N',N"-Triglycidyl isocyanurate (Araldit® PT 810)

A-3: Bisphenol A diglycidyl ether (Araldit® MY 790)

A-4: Bisphenol F diglycidyl ether (Araldit® BY 281)

A-5: Bisphenol A diglycidyl ether (Araldit® GT 7203)

A-6: Bisphenol A diglycidyl ether (Araldit® GT 6071)

A-7: Bisphenol A diglycidyl ether (Araldit® GT 6099)

A-8: Bisphenol A diglycidyl ether (Araldit® GT 6084)

B-1: Pentaerythrityl β-(3,5-di-tert-butyl-4-hydroxyphenyl) propionate

B-2: Triethylene glycol bis-3-(3-tert-butyl-4-hydroxy-5-methylphenyl)propionate

B-3: Ca salt of monoethyl 3,5-di-tert-butyl-4-hydroxybenzylphosphonate

BC-1: 1 part of B-1 and 1 part of C-1

BC-2: 1 part of B-1 and 2 parts of C-1

C-1: Tris(2,4-di-tert-butylphenyl)phosphite

D-1: Magnesium stearate

D-2: Calcium oxide

D-3: Calcium stearate

T-1: Distearyl thiodipropionate

The MVR (melt volume rate) and the MFR (melt flow rate) are determined according to ISO 1133.

The impact strength is determined according to DIN 53448, test specimen shape 4 (corresponding to ASTM D 1822-1979).

EXAMPLE 1

In a Brabender mixer chamber W 50 (40 rpm) heated to 200° C., 36.6 g of damaged polypropylene (PP) (cf. A) are kneaded under an $N_2$ atmosphere for 30 min. The additives (Table 1) are introduced into the mixer chamber right at the beginning, together with the PP. After 30 min, the mixing is stopped and the polymer material is removed from the mixer chamber and compression moulded at 30° C. at about 50 kN for 1 min. 2 mm thick sheets are then produced from this compression moulding at 200° C/50 kN.

Test specimens are punched from these sheets. Furthermore, the MVI is determined after comminution of the sheets (Table 1).

TABLE 1

| Example | Stabilizers | MVI (190/2.16) | Tensile impact strength [kJ/m$^2$] |
|---|---|---|---|
| — | — | 79.4 | 39 |
| 1 | 5% A-1 + 0.07% B-1 + 0.14% C-1 | 3.6 | 94 |

Table 1 clearly shows the material-improving effect of the additive system according to the invention.

EXAMPLES 2–4

42 g of damaged HDPE (cf. A) are introduced together with the additives (Table 2) into the Brabender mixer chamber W 50 (40 rpm) preheated to 180° C. and kneaded for 10 min.

2 mm thick test sheets are produced and test speimens are punched out analogously to Example 1.

TABLE 2

| Example | Stabilizers | Tensile impact strength [kJ/m$^2$] |
| --- | --- | --- |
| — | — | 251 |
| 2 | 5% A-1 + 0.7% B-1 + 0.14% C-1 | 304 |
| 3 | 5% A-2 + 0.7% B-1 + 0.14% C-1 | 288 |
| 4 | 5% A-3 + 0.7% B-1 + 0.14% C-1 | 293 |

The tensile impact test clearly shows the improving effect of the additive system according to the invention.

EXAMPLE 5

In a Brabender mixer chamber W 50 (40 rpm) heated to 200° C., 36.14 g of BOPP film agglomerate (cf. B) are kneaded together with the additives (Table 3) under nitrogen for 30 min.

2 mm thick test sheets are produced and test specimens are punched out analogously to Example 1.

TABLE 3

| Example | Stabilizers | MVI (230/2.16) | Tensile impact strength [kJ/m$^2$] |
| --- | --- | --- | --- |
| — | — | 41.0 | 74 |
| 5 | 5% A-3 + 0.1% B-1 + 0.1% C-1 | 10.5 | 196 |

Both the melt flow and the tensile impact strength are improved in Example 5 according to the invention.

EXAMPLE 6 AND 7

35.5 g of hollow polyolefin material (cf. C) are introduced, together with the stabilizers B-1 and C-1 (Table 4), into a Brabender mixer chamber W 50 (40 rpm) heated to 230° C. After 1.5 min, the epoxide compound A-2 or A-3 (Table 4) is added to the polymer melt and mixed for 30 min.

2 mm thick test sheets are produced and test specimens are punched out analogously to Example 1.

TABLE 4

| Example | Stabilizers | Tensile impact strength [kJ/m$^2$] |
| --- | --- | --- |
| — | — | 109 |
| 6 | 5% A-2 + 0.07% B-1 + 0.14% C-1 | 234 |
| 7 | 5% A-3 + 0.07% B-1 + 0.14% C-1 | 317 |

The tensile impact strength demonstrates the improvement to the material in the examples according to the invention in comparison with the unstabilized sample.

EXAMPLES 8 AND 9

TABLE 5

Brabender experiment (20 min, 220° C., 40 rpm) with EPS recycled material from packaging (granules)

|  | % | Additive | MVR (200/2.16) |
| --- | --- | --- | --- |
| Comparison | — | none | 22.8 |
| Ex. 8 | 5/0.10 | A-1/B-2 | 10.4 |
| Ex. 9 | 5/0.10 | A-2/B-2 | 9.4 |

In a Brabender mixer chamber W 50 (40 rpm) heated to 220° C., 45 g of EPS recycled material from packaging are kneaded for 20 min. The additives (Table 5) are introduced into the mixer chamber right at the beginning, together with the EPS granules. After 10 min, the mixing is stopped and the polymer material is removed from the mixer chamber and compression moulded at 30° C. and at about 20 kN for 1 min.

2 mm thick sheets are produced from this compression moulding at 200° C/50 kN.

The MVR value is determined for said sheets after comminution.

The comparative experiment is carried out in an analogous manner.

The samples stabilized according to the invention show a smaller MVR value than the comparison.

EXAMPLES 10–13

TABLE 6

Brabender experiment (230° C., 40 rpm, 30 min, N$_2$)
PP battery container material (regranulated material)

| Example | % | Additive | MFR (230/2.16) |
| --- | --- | --- | --- |
| Comparison | — | none | >100 |
| Comparison | 0.07/0.13 | B-1/C-1 | 69 |
| Ex. 10 | 1/0.07/0.13 | A-2/B-1/C-1 | 32.5 |
| Ex. 11 | 2/0.07/0.13 | A-2/B-1/C-1 | 29.0 |
| Ex. 12 | 1/0.07/0.13 | A-3/B-1/C-1 | 37.6 |

In a Brabender mixer chamber W 50 (40 rpm) heated to 230° C., 38.5 g of the recycled PP material from waste battery containers are kneaded for 30 min under nitrogen. The additives (Table 6) are introduced into the mixer chamber right at the beginning together with the PP granules. After 30 min, the mixing is stopped and the polymer material is removed from the mixer chamber and compression moulded at 30° C. at about 20 kN for 1 min.

2 mm thick sheets are produced from this compression moulding at 200° C/50 kN.

The MFR value of said sheets is determined after comminution.

The comparative examples are carried out in an analogous manner.

The samples stabilized according to the invention show a smaller MFR value than the comparison.

TABLE 7

Multiple extrusion (230° C., 75 rpm, twin-screw laboratory extruder)
PP battery container material (regranulated material)

| Example | % | Additive | MFR (230/2.16) |
| --- | --- | --- | --- |
| Comparison | — | none | 9.4 |
| Ex. 10 | 1/0.07/0.13 | A-2/B-1/C-1 | 8.2 |
| Ex. 11 | 2/0.07/0.13 | A-2/B-1/C-1 | 8.3 |
| Ex. 13 | 1/0.07/0.13 | A-4/B-1/C-1 | 8.5 |

Regranulated PP material originating from waste battery containers is premixed together with the additives according to the invention (Table 7) in a mixing drum for 20 min at room temperature and then extruded in a twin-screw laboratory extruder (T: 230° C.).

The MFR value of the granules is determined.

The comparative example is carried out in an analogous manner.

The samples stabilized according to the invention show a smaller MFR value than the comparison.

EXAMPLES 14–17

TABLE 8

Brabender experiment (220° C., 46 rpm, 20 min, $N_2$)
Waste ABS from automotive applications

| Example | % | Additive | Tensile impact strength [kJ/m$^2$] |
|---|---|---|---|
| Comparison | — | none | 125 |
| Ex. 14 | 1/0.05 | A-5/B-2 | 142 |
| Ex. 15 | 1/0.05/0.05 | A-5/B-2/D-1 | 150 |
| Ex. 16 | 1/0.05 | A-5/B-3 | 142 |
| Ex. 17 | 1/0.05 | A-2/B-2 | 141 |

In a Brabender mixer chamber W 50 (46 rpm) heated to 220° C., 44 g of recycled ABS material from automotive applications are kneaded for 20 min under nitrogen. The additives (Table 8) are introduced into the mixer chamber right at the beginning, together with the ABS granules. After 20 min, the mixing is stopped and the polymer material is removed from the mixer chamber and compression moulded at 30° C. and at about 20 kN for 1 min.

2 mm thick sheets are produced from this compression moulding at 200° C/50 kN. Test specimens for the tensile impact test are punched from the sheets.

The comparative example is carried out in an analogous manner.

The samples stabilized according to the invention show a higher tensile impact strength than the comparison. The mechanical properties are kept at a higher level by the additive according to the invention.

EXAMPLES 18–28

Washed, shredded waste plastics material (PP copolymer originating from coated bumpers) is homogenized with the additives according to the invention (Table 9) in a tumbling mixer and then extruded five times in succession in a single-screw extruder (T: 260° C.). After the 1st, 3rd and 5th extrusion, the melt flow rate (MFR: 130° C/2.16 kg) according to DIN 53735 M (ISO 1133/12) is determined in each case.

Sheets (thickness: 2 mm) are then produced from the granules of the 1st extrusion stage at max. 230° C. on an injection moulding machine (Aarburg 100). These sheets are subjected to artificial ageing at 150° C. in a forced-draft oven until embrittlement occurs.

5 test sheets of each singly extruded material are used for determining the elongation at break in % at 23° C. (tensile test to DIN 53455) (cf. Table 9).

The samples stabilized according to the invention show only a small increase in the melt flow rate after repeated extrusion. The melt flow rate increases as a result of degradation reactions and decomposition of the polymer (breaking of chains).

By adding the stabilizer according to the invention, the time to embrittlement of the sample in a forced-draft oven at 150° C. is improved compared with unstabilized samples.

Furthermore, the samples stabilized according to the invention have high elongations at break compared with an unstabilized sample.

TABLE 9

PP/EPDM: milled coated material

| | | Melt Flow (230/2.16) | | | Storage in oven at 150° C. | Elongation at break at 23° C. |
|---|---|---|---|---|---|---|
| | Additives | 1. Ex. | 3. Ex. | 5. Ex. | to fracture (days) | (%) |
| | no additive | — | 4.17 | 4.97 | 5.73 | 13 | 142 |
| Ex. 18 | 0.20% BC-1 | 0.25% A-6 | 4.25 | 4.28 | 4.86 | 16 | 225 |
| Ex. 19 | 0.20% BC-1 | 0.50% A-6 | 4.07 | 4.41 | 4.40 | 20 | — |
| Ex. 20 | 0.20% BC-1 | 1.00% A-6 | 4.02 | 4.42 | 4.32 | 25 | — |
| Ex. 21 | 0.20% BC-1 | 1.00% A-7 | 3.99 | 4.19 | 4.71 | 20 | 329 |
| Ex. 22 | 0.20% BC-1 + 0.10% T-1 | 0.50% A-6 | 4.12 | 4.10 | 4.75 | 22 | >350 |
| Ex. 23 | 0.10% BC-1 + 0.10% D-2 | 0.25% A-6 | 3.85 | 4.14 | 4.37 | 15 | 157 |
| Ex. 24 | 0.10% BC-1 + 0.10% D-2 | 0.50% A-6 | 3.83 | 4.41 | 4.33 | 19 | 319 |
| Ex. 25 | 0.10% BC-1 + 0.10% D-2 | 1.00% A-6 | 3.76 | 3.79 | 3.96 | 25 | 292 |
| Ex. 26 | 0.12% BC-2 + 0.08% D-3 | 0.50% A-6 | 4.01 | 4.15 | 4.59 | 17 | 273 |
| Ex. 27 | 0.12% BC-2 + 0.08% D-3 + 0.20% T-1 | 0.50% A-6 | 4.03 | — | — | 20 | 300 |
| Ex. 28 | 0.12% BC-2 + 0.08% D-3 | 0.50% A-8 | 3.99 | — | — | >23 | 277 |

What is claimed is:

1. A process for the stabilization of recycled thermoplastics selected from the group consisting of polymers and copolymers containing a polyolefin, which process comprises adding to said thermoplastic a) 0.05 to 20% by weight, based on the weight of plastic being stabilized, of at least one polyfunctional epoxide having at least two terminal epoxide moieties and b) 0.01 to 2% by weight, based on the weight of plastic being stabilized, of at least one sterically hindered phenol.

2. A process according to claim 1, wherein, in addition to components a) and b), c) 0.01 to 2% by weight, based on the weight of plastic to be stabilized, of at least one organic phosphite or phosphonite are added.

3. A process according to claim 1 or 2, wherein, in addition to components a) and b) or a) to C), d) up to 10% by weight, based on the weight of plastic to be stabilized, of an inorganic compound from the series comprising the metal oxides, hydroxides or carbonates or a metal salt of a fatty acid are used.

4. A process according to claim 1, wherein a compound of the types (I) to (III) or a mixture of these

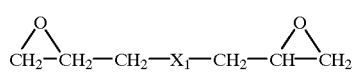 (I)

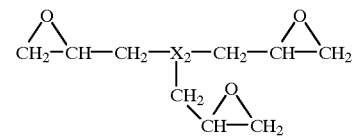 (II)

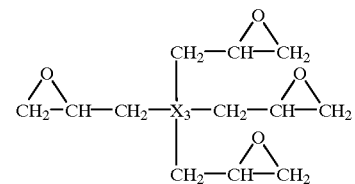 (III)

in which $X_1$, $X_2$ and $X_3$ are cyclohexylene, phenylene or naphthylene which may be unsubstituted or substituted and $X_1$ is additionally an unsubstituted or substituted radical of the formula

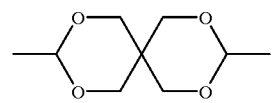

and $X_2$ is additionally an unsubstituted or substituted radical of the formula

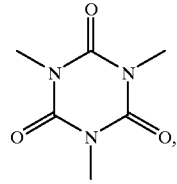

is used as component a).

5. A process according to claim 1, wherein a compound or a mixture of compounds of the formula

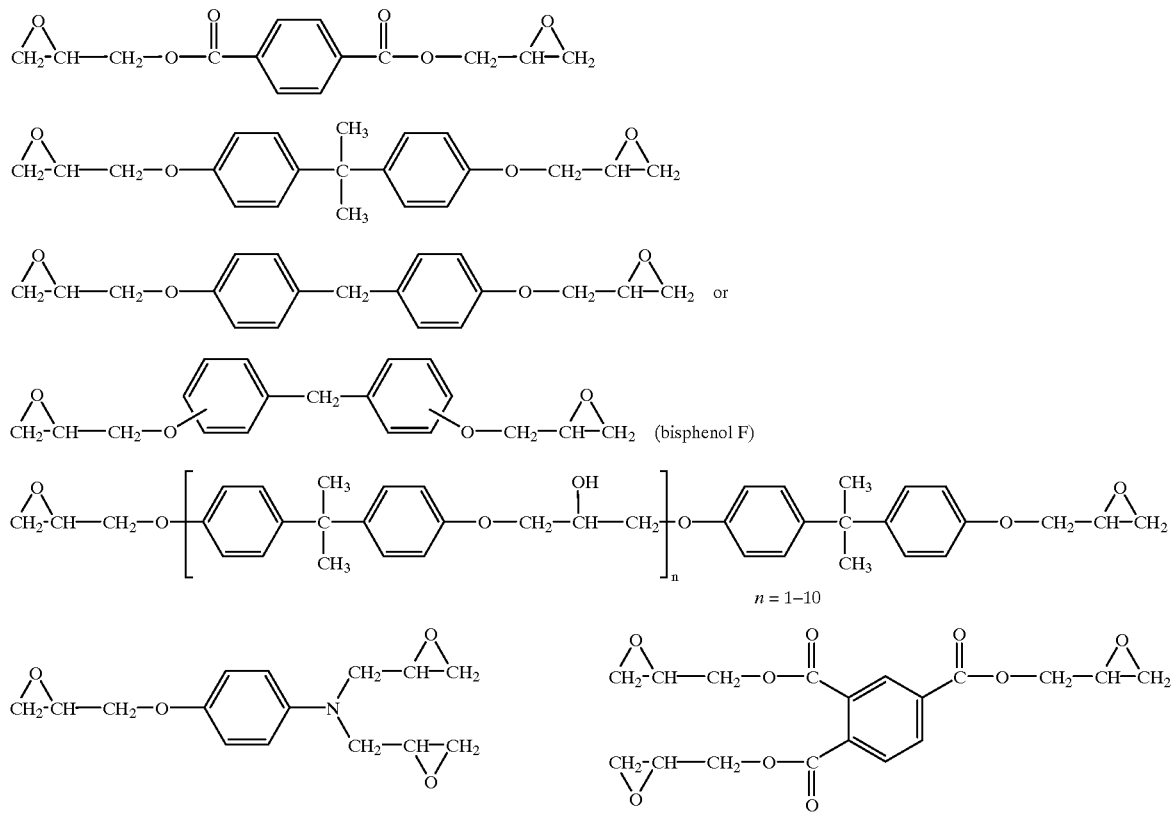

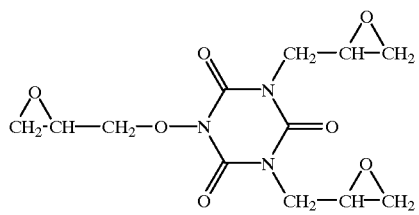

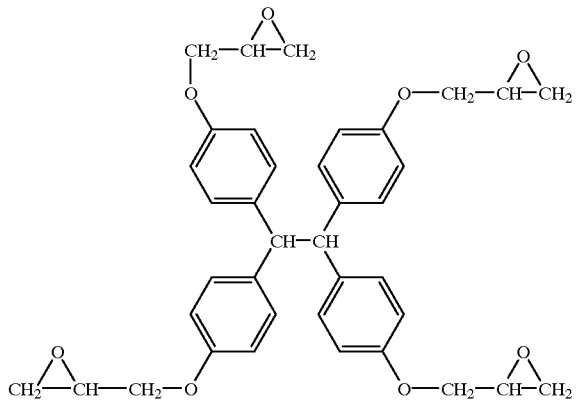

is used as component a).

6. A process according to claim 1 wherein a compound comprising at least one group of the formula

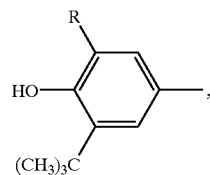
(B)

in which R is hydrogen, methyl or tert-butyl, is used as component b).

7. A process according to claim 1, wherein a compound comprising at least one group of the formula

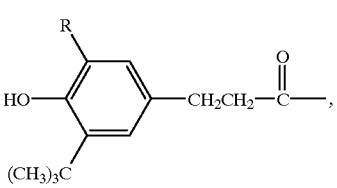
(C)

in which R' is methyl or tern-butyl, is used as component b).

8. A process according to claim 2 wherein an aromatic phosphite or phosphonite is used as component c).

9. A process according to claim 3 or 2, wherein a metal oxide, hydroxide or carbonate of the elements of main group II and subgroup II, IV or VII; or a zinc, tin, magnesium or calcium salt from the series comprising the aliphatic saturated $C_2$–$C_{22}$carboxylates, the aliphatic unsaturated $C_3$–$C_{22}$carboxylates, the aliphatic $C_2$–$C_{22}$carboxylates which are substituted by at least one OH group, the cyclic and bicyclic carboxylates having 5–22 C atoms, the phenylcarboxylates which are unsubstituted, substituted by at least one OH group and/or $C_1$–$C_{16}$alkyl-substituted, the naphthylcarboxylates which are unsubstituted, substituted by at least one OH group and/or $C_1$–$C_{16}$alkyl-substituted, the phenyl-$C_1$–$C_{16}$alkylcarboxylates, the naphthyl-$C_1$–$C_{16}$alkylcarboxylates or the unsubstituted or $C_1$–$C_{12}$alkyl-substituted phenolates is used as additional component d).

10. A mixture comprising a recycled thermoplastic selected from the group consisting of polymers and copolymers containing a polyolefin, a) 0.05 to 20%, based on the weight of plastic, of at least one polyfunctional epoxide having at least two terminal epoxide moieties, b) 0.01 to 2% by weight, based on the weight of plastic, of at least one sterically hindered phenol and, optionally, c) 0.01 to 2% by weight, based on the weight of plastic, of at least one organic phosphite or phosphonite.

11. A mixture comprising a recycled thermoplastic selected from the group consisting of polymers and copolymers containing a polyolefin, a) at least one polyfunctional epoxide having at least two terminal epoxide moieties, b) at least one sterically hindered phenol, c) at least one organic phosphite or phosphonite and d) at least one organic compound from the series comprising the metal oxides, hydroxides or carbonates or a metal salt of a fatty acid, the weight ratio of components b:c being 10:1 to 1:10; the weight ratio of components (b+c):d being 10:1 to 1:10; the weight ratio of components a:(b+c+d) being 100:1 to 10:1.

12. A process according to claim 1, wherein a thiosynergist from the series comprising the esters of thiodipropionic acid is additionally introduced, in an amount of 0.1 to 1% by weight, based on the weight of recycled plastic, into the recycled plastic.

13. A process according to claim 1, wherein a thiosynergist from the series comprising the esters of thiodipropionic acid is additionally introduced into the recycled plastic.

14. A process according to claim 1, wherein at least one light stabilizer from the series comprising the benzophenones, benzotriazoles, oxanilides or sterically hindered amines or mixtures thereof is additionally introduced into the recycled plastic.

15. A process according to claim 1, wherein at least one light stabilizer from the series comprising the benzophenones, benzotriazoles, oxanilides or statically hindered amines is additionally introduced, in an amount of 0.01 to 2% by weight, based on the weight of recycled plastic, into the recycled plastic.

16. A process according to claim 1, wherein a light stabilizer from the series comprising the benzotriazoles and a light stabilizer from the series comprising the sterically hindered amines are added.

17. A process according to claim 1, wherein the recycled thermoplastic is a recycled polyolefin.

18. A process according to claim 1, wherein the recycled thermoplastic is a recycled PP/EPDM.

19. A recycled thermoplastic obtained by the process according to claim 1.

* * * * *